(12) United States Patent
Kamikubo et al.

(10) Patent No.: US 11,182,950 B2
(45) Date of Patent: Nov. 23, 2021

(54) INFORMATION PROCESSING DEVICE AND INFORMATION PROCESSING METHOD

(71) Applicant: SONY CORPORATION, Tokyo (JP)

(72) Inventors: Rie Kamikubo, Kanagawa (JP); Ryuichi Suzuki, Tokyo (JP); Miwa Ichikawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 60 days.

(21) Appl. No.: 16/613,497

(22) PCT Filed: Apr. 18, 2018

(86) PCT No.: PCT/JP2018/015961
§ 371 (c)(1),
(2) Date: Nov. 14, 2019

(87) PCT Pub. No.: WO2018/216402
PCT Pub. Date: Nov. 29, 2018

(65) Prior Publication Data
US 2021/0158605 A1    May 27, 2021

(30) Foreign Application Priority Data
May 23, 2017 (JP) .............................. JP2017-101479

(51) Int. Cl.
*G06T 15/20* (2011.01)
*G09G 5/38* (2006.01)

(52) U.S. Cl.
CPC .............. *G06T 15/20* (2013.01); *G09G 5/38* (2013.01); *G09G 2354/00* (2013.01)

(58) Field of Classification Search
CPC ........ G09G 5/38; G09G 2354/00; G06T 15/20
See application file for complete search history.

(56) References Cited

U.S. PATENT DOCUMENTS

| 6,336,072 B1 | 1/2002 | Takayama et al. |
| 2016/0050069 A1 | 2/2016 | Griffin et al. |

(Continued)

FOREIGN PATENT DOCUMENTS

| CN | 1746821 A | 3/2006 |
| EP | 1003017 A2 | 5/2000 |
| JP | 2000-215211 A | 8/2000 |

(Continued)

OTHER PUBLICATIONS

English Translation of IDS JP2010175329A (Year: 2010).*

(Continued)

*Primary Examiner* — Samantha (Yuehan) Wang
(74) *Attorney, Agent, or Firm* — Chip Law Group

(57) ABSTRACT

The present disclosure proposes a new and improved information processing device and information processing method capable of reducing user's uncomfortable feeling upon changing an image displayed in a three-dimensional virtual space. According to the present disclosure, there is provided an information processing device including a control unit that performs control to display, with a user's first-person viewpoint, a three-dimensional virtual space where a viewed target image is arranged to change the viewed target image while fixing a peripheral image of the viewed target image. The viewed target image is a target to be viewed by a user.

19 Claims, 12 Drawing Sheets

(56) References Cited

U.S. PATENT DOCUMENTS

2018/0204380 A1* 7/2018 Kumar ................ G06T 19/20
2019/0026944 A1* 1/2019 Laaksonen ............ G06T 17/05

FOREIGN PATENT DOCUMENTS

| JP | 2006-079174 A | 3/2006 |
| JP | 2010-175329 A | 8/2010 |
| JP | 2013-097094 A | 5/2013 |

OTHER PUBLICATIONS

International Search Report and Written Opinion of PCT Application No. PCT/JP2018/015961, dated Jul. 10, 2015, 10 pages of ISRWO.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/015961 filed on Apr. 18, 2018, which claims priority benefit of Japanese Patent Application No. JP 2017-101479 filed in the Japan Patent Office on May 23, 2017. Each of the above-referenced applications is hereby incorporated herein by reference in its entirety.

TECHNICAL FIELD

The present disclosure relates to an information processing device, an information processing method, and a program.

BACKGROUND ART

Patent Document 1 discloses a technology for arranging a subject image and a panoramic image in a three-dimensional virtual space and displaying the images with a user's viewpoint (i.e., first-person viewpoint).

CITATION LIST

Patent Document

Patent Document 1: Japanese Patent Application Laid-Open No. 2013-97094

SUMMARY OF THE INVENTION

Problems to be Solved by the Invention

By the way, in a case where all of such images displayed with the first-person viewpoint are changed at the same period of time, the user sometimes feels uncomfortable about the change of the images. Such an uncomfortable feeling may appear as so-called motion sickness.

Therefore, the present disclosure proposes a new and improved information processing device, information processing method, and program capable of reducing user's uncomfortable feeling upon changing an image displayed in a three-dimensional virtual space.

Solutions to Problems

According to the present disclosure, there is provided an information processing device including a control unit that performs control to display, with a user's first-person viewpoint, a three-dimensional virtual space where a viewed target image is arranged, and performs control to change the viewed target image while fixing a peripheral image of the viewed target image, the viewed target image being a target to be viewed by a user.

According to the present disclosure, there is provided an information processing method including, under the control of a processor, displaying a three-dimensional virtual space where a viewed target image which is to be viewed by a user is arranged, with a user's first-person viewpoint, and moving the viewed target image while fixing a peripheral image of the viewed target image.

According to the present disclosure, there is provided a program for causing a computer to achieve a control function of performing control to display, with a user's first-person viewpoint, a three-dimensional virtual space where a viewed target image is arranged, and performing control to change the viewed target image while fixing a peripheral image of the viewed target image, the viewed target image being a target to be viewed by a user.

According to the present disclosure, a viewed target image on which the user's attention is expected to be focused is changed and a peripheral image surrounding the viewed target image is fixed. Thus, it is possible to reduce the user's uncomfortable feeling.

Effects of the Invention

As described above, according to the present disclosure, it is possible to reduce the user's uncomfortable feeling, when changing an image displayed in a three-dimensional virtual space. Note that the effects are not necessarily limited to the above description, and the present disclosure may have any of the effects described herein or other effects conceivable from the present description in addition to or instead of the above effects.

MODE FOR CARRYING OUT THE INVENTION

Figure 1:
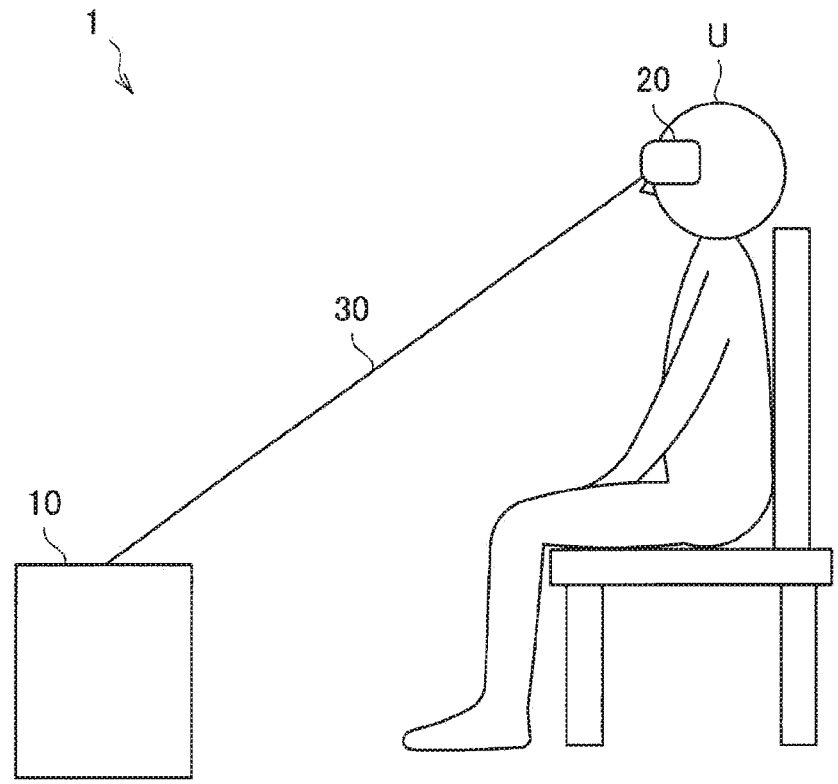
FIG. 1 is an explanatory diagram illustrating an example of a use state of an information processing system according to an embodiment of the present disclosure.

Hereinafter, preferred embodiments of the present disclosure will be described in detail with reference to the accompanying drawings. Note that in the present description and the drawings, components having substantially the same functional configurations will be denoted by the same reference numerals and redundant description will be omitted.

Note that description will be given in the following order.
1. Configuration of information processing system
   1-1. Overall configuration
   1-2. Configuration of control device 1-3. Configuration of display device
2. First display control process
3. Second display control process
<1. Configuration of Information Processing Device>
(1-1. Overall Configuration)

Firstly, the overall configuration of an information processing system 1 according to the present embodiment will be described with reference to FIG. 1. As illustrated in FIG. 1, the information processing system 1 includes a control device (information processing device) 10, a display device 20, and a communication cable 30.

The control device 10 arranges an actual scene image in a three-dimensional virtual space. Then, the control device 10 causes the display device 20 to display, with a user's first-person viewpoint, the three-dimensional virtual space in which the actual scene image is arranged. Specifically, the control device 10 sets a virtual user's viewpoint which is a user's viewpoint in the virtual space and generates a display image seen from the virtual user's viewpoint. Here, the virtual user's viewpoint is specified on the basis of attitude detection information transmitted from the display device 20. The attitude detection information is generated by an attitude detection unit incorporated in the display device 20. "An image seen from the virtual user's viewpoint" means an image seen in a user's field of view in the virtual space. Then, the control device 10 causes the display device 20 to display a display image.

The display device 20 includes a so-called head-mounted display (HMD) and is mounted around the eyes of a person U (user). Then, the above-described display image is displayed on the display device 20. Then, when the virtual user's viewpoint changes due to operation by the user (e.g., face movement, instruction operation for "forward movement", or the like), the display image changes according to the operation. Therefore, the user can enjoy a virtual experience as if the user exists in an actual scene.

Note that the control device 10 and the display device 20 may be integrally constituted. For example, the display device 20 may have the function of the control device 10. Furthermore, the display device 20 is not limited to a head-mounted display and may be another type of display. For example, the display device 20 may include a stationary display or a display of a portable terminal (e.g., mobile phone, smartphone, smart tablet, portable game device, or the like). In this case, the attitude detection unit can be achieved by providing an imaging device, for example, for the display or the portable terminal.

Incidentally, in a case where the whole of the display image is changed in accordance with the change in the virtual user's viewpoint at the same period of time, the user sometimes feels uncomfortable with the change of the actual scene image. For example, in a case where the actual scene image is moved along a road image in the actual scene image, the user may have an illusion that the user is moving even though he/she is not moving actually. As a matter of course, it can be said that the technology for displaying the actual scene image with the first-person viewpoint is a technology for entertaining the user with such an illusion. However, such an illusion may make some users have an uncomfortable feeling. In addition, such an uncomfortable feeling may cause so-called motion sickness. Furthermore, the image displayed with the first-person viewpoint frequently changes, which may also cause the user to feel uncomfortable. In particular, since the head-mounted display is used as the display device 20, an image is displayed over almost whole of the user's field of view. Therefore, it is assumed that this configuration is highly likely to make the user have the uncomfortable feeling.

The present inventor considered that the user's uncomfortable feeling may be caused due to an individual's visual characteristic. In other words, a person focuses his/her attention on a specific region, including his/her viewpoint, of an image seen in the person's field of view. Therefore, even if the image is changed in this region, it is considered that the user does not often feel uncomfortable. On the other hand, if there is a change in an image outside the region on which the user focuses his/her attention, it is considered that there is a high possibility that the user feels uncomfortable. Furthermore, also in a case where there is a change unexpected to the user, it is considered that there is a high possibility that the user has an uncomfortable feeling.

Therefore, the present inventor studied a technology for reducing the uncomfortable feeling of the user. Firstly, the present inventors studied a teleport technique. For example, assuming that the virtual user's viewpoint moves from a certain point to another in a three-dimensional virtual space in which the actual scene image is arranged, the actual scene image seen from the virtual user's viewpoint being moving is displayed on the display device 20. In other words, the actual scene image is displayed in the state of changing. The user may feel uncomfortable with such change. Therefore, in the teleport technique, immediately after displaying the actual scene image of the certain point, the actual scene image of the other point is displayed. However, in this technique, it is difficult for the user to grasp a spatial image during the movement. Furthermore, it is difficult for the user to get the sense of distance between the points.

Next, the present inventors studied a technique for superimposing a fixed image (such as a vehicle cockpit image, for example) on a display image. It can be expected that such a fixed object seen in a user's field of view may reduce the user's uncomfortable feeling. However, this technique may degrade realism, reducing the user's feeling of experience of exploration.

Next, the present inventor studied a technique for clearly displaying only a region of a display image on which the user is expected to focus his/her attention and blurring or hiding the peripheral region therearound. However, this technique reduces the amount of information obtained from the display image. Furthermore, the user's feeling of immersion is reduced.

Next, the present inventor studied a third-person viewpoint. In this technique, a person image corresponding to the user is arranged in a virtual space, and a region including the person image is displayed with a third-person viewpoint. This technique can be also expected to reduce the uncomfortable feeling of the user. However, this technique degrades the user's feeling that the user is moving by himself/herself.

As described above, any of the above techniques considerably degrade the virtual experience provided for the user. Therefore, in the present embodiment, while changing an image (e.g., a moving viewpoint image 230. See a first display control process, which is described later) in a region on which the user is expected to focus his/her attention, the peripheral image out of the region is fixed. Furthermore, change of an image (e.g., movement of a character image P. See a second display control process, which is described later) causes the user to predict the next change of the image. Thus, the user can enjoy the virtual experience with a reduced uncomfortable feeling. Hereinafter, the information processing system according to the present embodiment will be described in detail.

(1-2. Configuration of Control Device)

Figure 2:
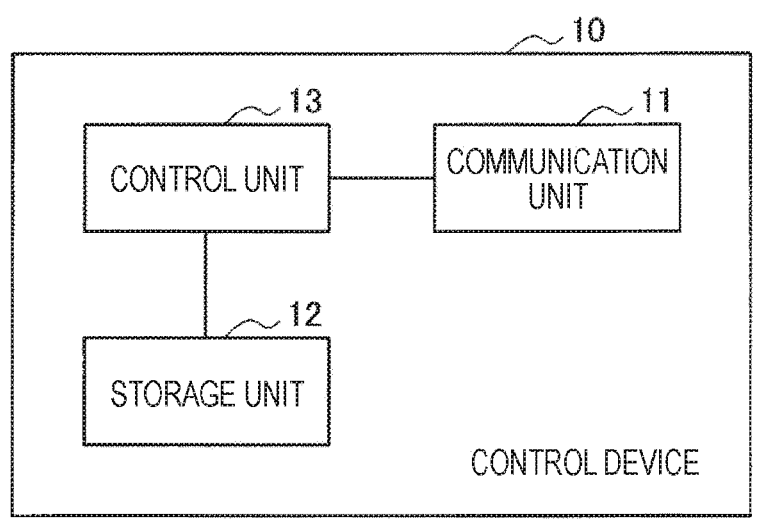
FIG. 2 is a block diagram illustrating a configuration of a control device.

Next, the configuration of the control device 10 will be described with reference to FIGS. 1 and 2. The control device 10 includes a communication unit 11, a storage unit 12, and a control unit 13. The control device 10 includes, as a hardware configuration, a central processing unit (CPU), namely a processor, a random access memory (RAM), a read only memory (ROM), a hard disk, a communication device, and the like. In the ROM, information, such as programs, necessary for processing by the control device 10 is recorded. The CPU reads and executes a program stored in the ROM.

The communication unit 11 includes, for example, a communication device and communicates with the display device 20 via the communication cable 30. Furthermore, the communication unit 11 is also capable of communicating with other information processing devices via a network, which is not illustrated, and may acquire, for example, an actual scene image, a map image, and the like through the communication. The actual scene image is an image obtained by imaging an actual scene. The communication unit 11 outputs information obtained each time the communication unit 11 communicates with the display device 20, to the control unit 13. Furthermore, the communication unit 11 transmits information, for example, a display image, provided from the control unit 13 to the display device 20.

The storage unit 12 includes, for example, a ROM, a RAM, a hard disk, and the like and stores information necessary for processing by the control device 10. For example, the storage unit 12 stores programs, various images, and the like. Here, the images stored in the storage unit 12 include an actual scene image, a map image, and the like.

The control unit 13 includes, for example, a CPU or the like and controls each component of the control device 10. Furthermore, the control unit 13 generates a display image to be displayed on the display device 20 and outputs the display image to the communication unit 11. Although detailed description thereof will be given later, for example, the control unit 13 arranges the actual scene image in a three-dimensional virtual space. Next, the control unit 13 sets a virtual user's viewpoint which is a user viewpoint in the virtual space and generates the display image seen from the virtual user's viewpoint.

(1-3. Configuration of Display Device)

Figure 3:
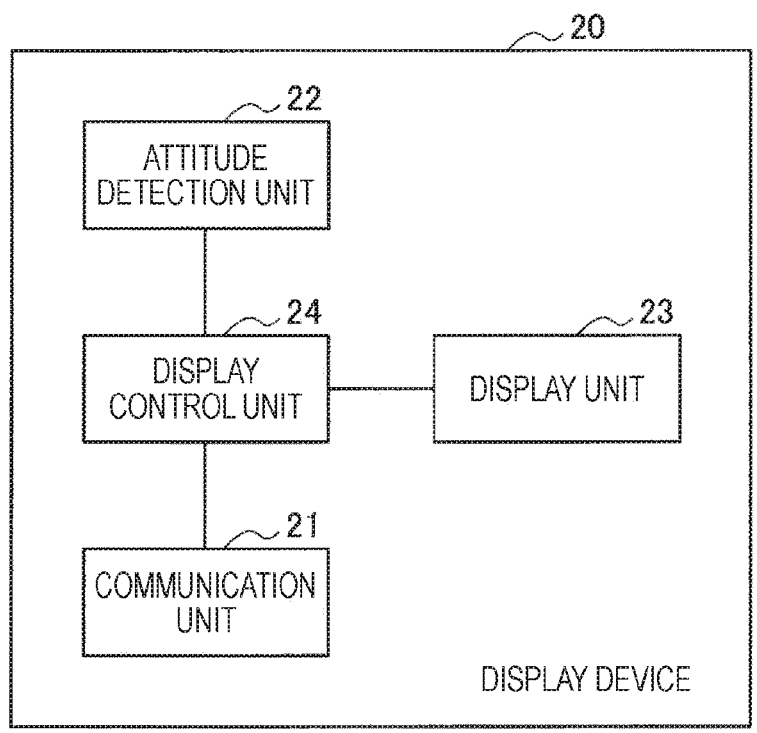
FIG. 3 is a block diagram illustrating a configuration of a display device.
Figure 4:
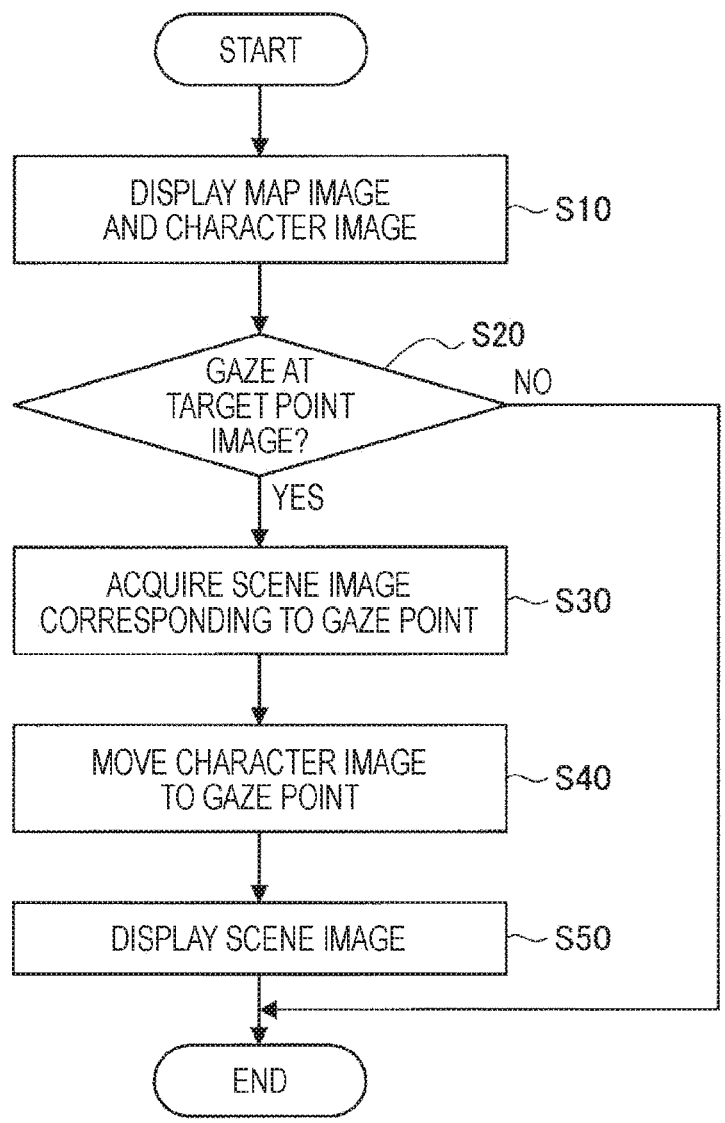
FIG. 4 is a flowchart illustrating an example of processing by the information processing system.
Figure 5:
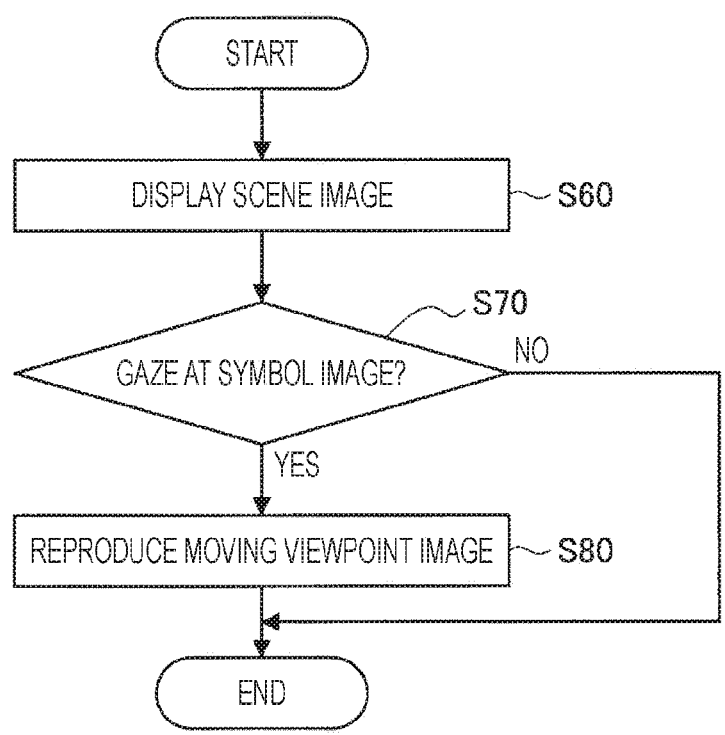
FIG. 5 is a flowchart illustrating an example of processing by the information processing system.

Next, the configuration of the display device 20 will be described with reference to FIGS. 1 and 3. The display device 20 includes a communication unit 21, an attitude detection unit 22, a display unit 23, and a display control unit 24. The display device 20 includes, as a hardware configuration, a central processing unit (CPU), namely a processor, a random access memory (RAM), a read only memory (ROM), an attitude detection sensor, a head-mounted display device, a communication device, and the like. In the ROM, information, such as programs, necessary for processing by the display device 20 is recorded. The CPU reads and executes a program stored in the ROM.

The communication unit 21 includes, for example, a communication device, and the like and communicates with the control device 10 via the communication cable 30. The communication unit 21 outputs information, for example, a display image, obtained each time the communication unit 21 communicates with the control device 10, to the display control unit 24. Furthermore, the communication unit 21 transmits information, for example, attitude detection information, which will be described later, provided from the display control unit 24 to the control device 10.

The attitude detection unit 22 includes, for example, an attitude detection sensor and detects the attitude of the display device 20. The attitude detection sensor may be, for example, a gyro sensor. The attitude detection unit 22 generates attitude detection information relating to the attitude of the display device 20 and outputs the generated attitude detection information to the display control unit 24. Here, the attitude of the display device 20 changes depending on the orientation of the user's head. Then, the user's viewpoint can be roughly identified on the basis of the orientation of the user's head. Therefore, in the present embodiment, the attitude detection information is used to specify the virtual user's viewpoint. As described above, the virtual user's viewpoint is specified on the basis of the attitude detection information from the attitude detection unit 22. Therefore, the user can move the virtual user's viewpoint by changing the orientation of the user's head.

Here, the attitude detection sensor may be a line-of-sight detection sensor (i.e., an imaging device for imaging the image of the vicinity of the user's eye) for detecting a user's line of sight. In this case, the attitude detection sensor can directly detect the line of sight of the user. Furthermore, the user can move the virtual user's viewpoint by changing the line of sight.

Furthermore, the information processing system 1 may include an input operation device capable of receiving an input operation from the user. The control unit 13 may move the virtual user's viewpoint on the basis of input operation information given from the input operation device.

Furthermore, the information processing system 1 may also include a sensor (e.g., an imaging device) for detecting the posture of the entire user's body. Then, the control unit 13 may specify the virtual user's viewpoint on the basis of detection information provided from the sensor. In other words, in this case, the control unit 13 integrally uses the orientations of the face, body, and line of sight of the user.

The display unit 23 includes, for example, a head-mounted display device and displays a display image or the like under the control of the display control unit 24.

The display control unit 24 includes, for example, a CPU or the like and controls each component of the display device 20. Furthermore, the display control unit 24 causes the display unit 23 to display the display image provided from the communication unit 21. Furthermore, the display control unit 24 outputs the attitude detection information provided from the attitude detection unit 22 to the communication unit 21.

(2. First Display Control Process)

Next, display control performed by the control unit 13 of the control device 10 will be described in detail. The control unit 13 performs control to display, with a user's first-person viewpoint, a three-dimensional virtual space where a viewed target image is arranged. The viewed target image is a target to be viewed by a user. Then, the control unit 13 performs control to change the viewed target image while fixing a peripheral image of the viewed target image. Specifically, the control unit 13 performs a first display control process and a second display control process. Note that the control unit 13 performs the first display control process and the second display control process, and meanwhile the display device 20 transmits the attitude detection information described above to the control device 10.

Firstly, the first display control process will be described with reference to FIGS. 4 and 6 to 12. In step S10, the control unit 13 arranges a map image 100 in the three-dimensional virtual space. Here, the map image 100 may be stored in the storage unit 12 in advance or may be acquired from another information processing device by the communication unit 11. The control unit 13 may allow the user to select the map image 100 to be arranged in the three-dimensional virtual space. In this case, for example, the control unit 13 causes the display device 20 to display a display image list having listed candidates of the map image. Specifically, the control unit 13 outputs the display image list to the communication unit 11, and the communication unit 11 transmits the display image list to the display device 20. The communication unit 21 of the display device 20 outputs the received display image list to the display control unit 24. The display control unit 24 causes the display unit 23 to display the display image list. All of the processing of "causing the display device 20 to display the image" are performed in the same manner as described above.

The display image list may use any list as long as the user can perceive the map image 100. For example, the display image list may be a list of thumbnails or the like of map images, a list of place names, or a combination thereof. The user selects a desired map image 100 from the display image list. A washing method therefor is not particularly limited but may include, for example, a selection method by using an input operation device, which is not illustrated, a selection method by using a virtual user's viewpoint, or the like. In the latter method, the control unit 13 causes the display device 20 to display the virtual user's viewpoint, which will be described later, together with the display image list.

Figure 6:
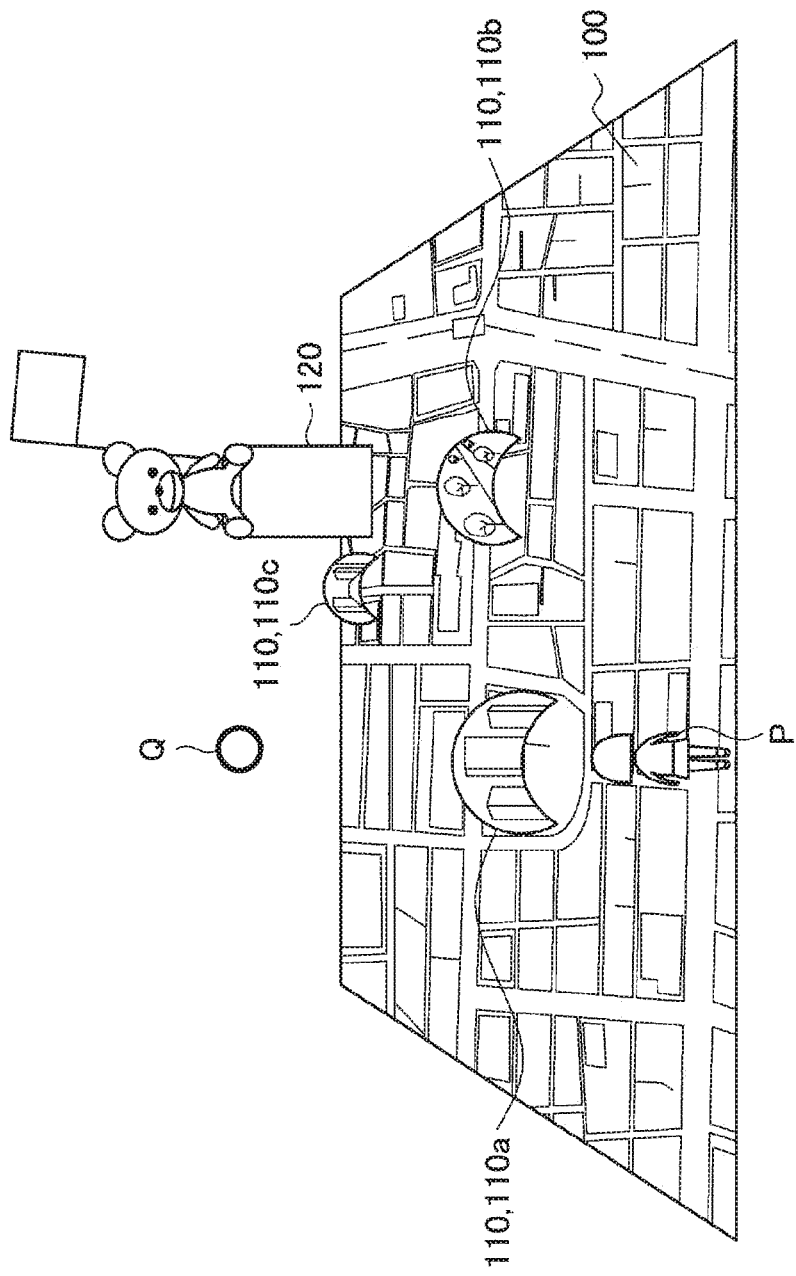
FIG. 6 is an explanatory diagram illustrating an example of a display on the display device.

Next, the control unit 13 sets one or a plurality of target points (i.e., a checkpoint) on the map image 100. Here, each of the target points may be, but is not limited to, for example, a point having a landmark. The target point may be set by the user. Next, the control unit 13 arranges target point images 110 indicating the target points, on the map image. Furthermore, in the vicinity of any of the target point images 110, a goal image 120 indicating that the target point is a final target point may be disposed. In FIG. 6, the goal image 120 is arranged in the vicinity of a target point image 110c. Furthermore, the control unit 13 may cause the user to select a time slot. Then, the control unit 13 may set a target point on the basis of the time slot selected by the user. For example, depending on a time slot selected by the user, there may be a landmark which is not in business (closed). Therefore, the control unit 13 may be configured not to set a landmark which is not in business as a target point.

Furthermore, the control unit 13 arranges a character image (following/moving image) P on the map image 100 as a viewed target image. An initial position of the character image P is not particularly limited. Although detailed description thereof will be given later, the character image P is also referred to as a puppet image or the like. Note that in this embodiment, an image imitating a person is referred to as the character image P, but the character image P may have any other shape. An image other than the character image P may be used as the following/moving image.

Furthermore, the control unit 13 specifies the virtual user's viewpoint as a user viewpoint in the virtual space, on the basis of the attitude detection information. Then, the control unit 13 arranges a virtual user's viewpoint image Q indicating the virtual user's viewpoint, in the three-dimensional virtual space.

Next, the control unit 13 generates an image seen from the virtual user's viewpoint, that is, an image seen in a user's field of view in the virtual space, as a display image. Then, the control unit 13 causes the display device 20 to display the display image. Thus, the control unit 13 causes the display device 20 to display, with the user's first-person viewpoint, the map image 100 and each image (the target point images 110, character image P, or the like) on the map image. Furthermore, the control unit 13 receives the attitude detection information at any time and generates a display image on the basis of the attitude detection information. Then, the control unit 13 causes the display device 20 to display the display image. Thus, the user can view the map image 100 and each image (the target point images 110, character image P, or the like) on the map image while freely moving the virtual user's viewpoint in the three-dimensional virtual space.

In step S20, the control unit 13 determines whether or not the user is gazing at any of the target point images 110. For example, the control unit 13 determines whether or not the virtual user's viewpoint image Q is on the target point image 110 for a predetermined time period or longer. In a case where it is determined that the user is gazing at any of the target point images 110, the control unit 13 proceeds to step S30, and in a case where it is determined that the user is not gazing at the target point image 110, the control unit 13 finishes this process.

In step S30, the control unit 13 acquires an actual scene image 300 (i.e., a scene image. See FIG. 9) corresponding to the target point image 110 at which the user is gazing. Such an actual scene image 300 may be stored in the storage unit 12 or may be acquired from another information processing device by the communication unit 11. Hereinafter, a target point image 110 which the user is gazing at is also referred to as a "gaze point image". Furthermore, a target point indicated by the gaze point image is also referred to as a "gaze point".

Figure 7:
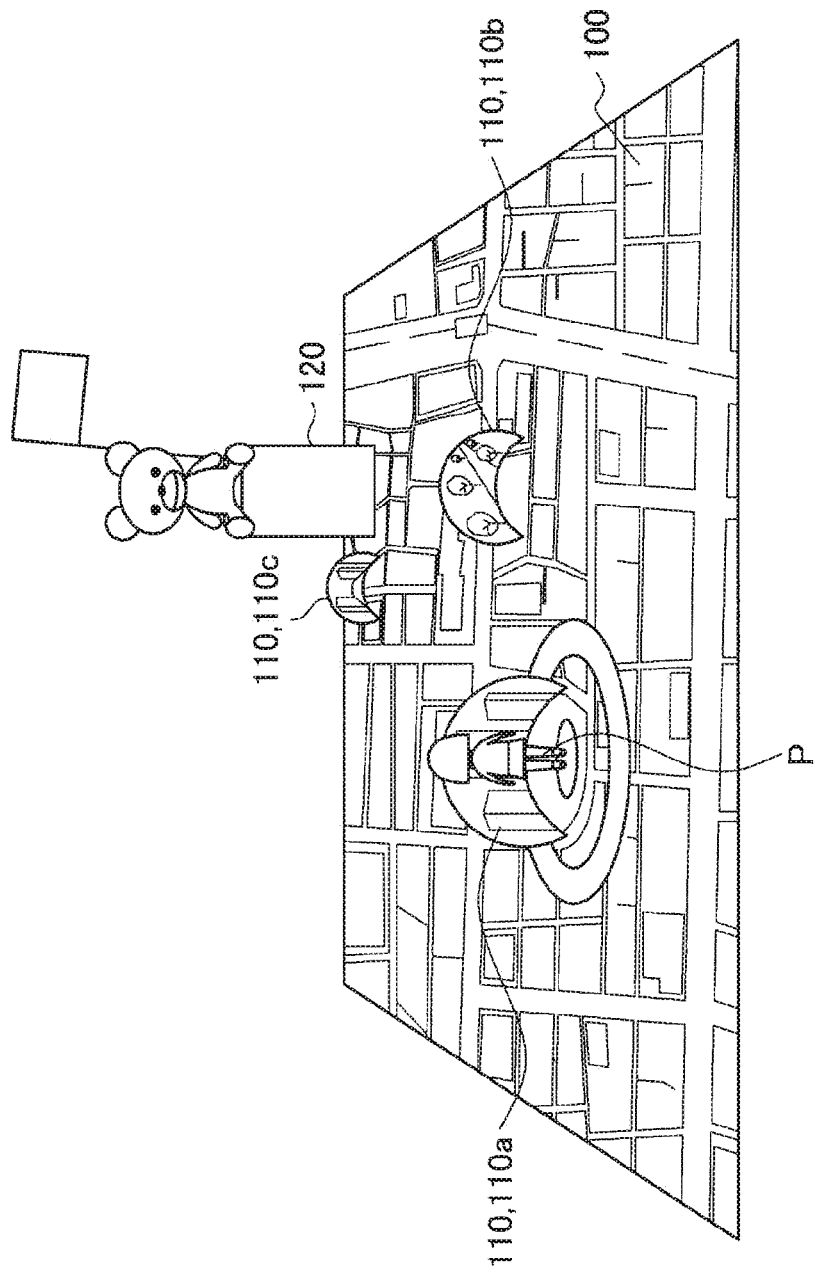
FIG. 7 is an explanatory diagram illustrating an example of a display on the display device.

In step S40, the control unit 13 moves the character image P onto the gaze point image. In other words, the control unit 13 moves the character image P following the virtual user's viewpoint. An example is illustrated in FIG. 7. In this example, the user is gazing at a target point image 110a, and the character image P is moved onto the target point image 110a. Thus, the user's attention can be concentrated on the character image P. Note that while the character image P moves, the map image 100 is fixed. In other words, the control unit 13 performs control to display, with the user's first-person viewpoint, the three-dimensional virtual space where the viewed target image (here, the character image P) is arranged. The viewed target image is a target to be viewed by the user. Furthermore, the control unit 13 performs control to change the viewed target image (here, the character image P is moved) while fixing the peripheral image (here, the map image 100) of the viewed target image. In other words, the control unit 13 changes only the character image P on which the user's attention is expected to be focused but fixes the peripheral image. Thus, it can be expected that the user's uncomfortable feeling is reduced.

Here, the control unit 13 may change the moving speed of the character image P according to the user's skill level (the number of times of execution of the first display control process, and the like). For example, the control unit 13 may increase the moving speed of the character image P as the user has a higher skill level. Even if the control unit 13 displays the character image P in such a manner, it is expected that the user having a higher skill level can understand a display content.

Then, the control unit 13 displays the actual scene image (scene image) 300 in the three-dimensional virtual space around the character image P, but if the actual scene image 300 is suddenly displayed, the user may feel uncomfortable. This is because the user may not be able to expect such change of the image.

Figure 8:
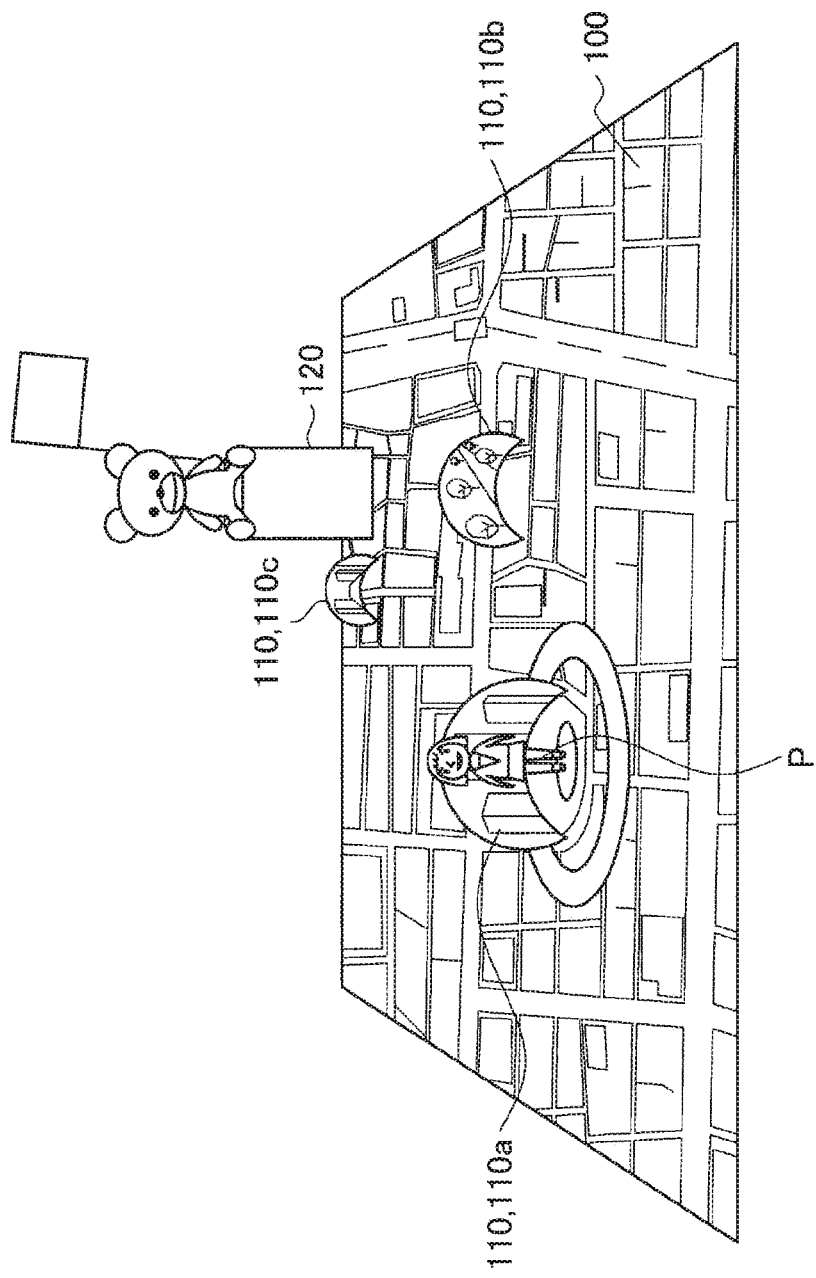
FIG. 8 is an explanatory diagram illustrating an example of a display on the display device.

Therefore, before displaying the actual scene image 300, the control unit 13 performs control to notify the user of such display. For example, as illustrated in FIG. 8, the control unit 13 causes the character image P positioned on the gaze point image (here, the target point image 110a) to look back to the user side. Thus, the control unit 13 causes the user to expect future image change (i.e., some change of the image relating to the gaze point image). Therefore, even if the actual scene image 300 is displayed in the three-dimensional virtual space around the character image P, the user unlikely has an uncomfortable feeling. As a matter of course, the method for notifying the user is not limited to this description, and any method may be used as long as the method can attract the user's attention. For example, some kind of notification sound may be output from the display device 20. Furthermore, a plurality of sound source output portions may be provided in the display device 20, and the notification sound may be output from different output positions depending on the gaze point. Thus, the user's attention to the gaze point can be further enhanced.

Note that the control unit 13 may omit the movement of the character image P and notification process described above in response to a selection operation or the like by a user. This is because a user who hardly feels uncomfortable (i.e., a user who hardly gets motion sickness) in change of the image may have a desire to immediately view the actual scene image 300.

Next, the control unit 13 zooms in to the character P from the virtual user's viewpoint. In other words, the map image and the character P are enlarged with the character P as the center. Note that when such enlargement processing is suddenly performed, there is a possibility that the user may feel uncomfortable, but as described above, the user notified thereof in advance hardly feels uncomfortable.

Here, when the virtual user's viewpoint deviates from the character P and returns to the character P again, the control unit 13 may perform a zoom-in process from the virtual user's viewpoint. The zoom-in process may be omitted.

Figure 9:
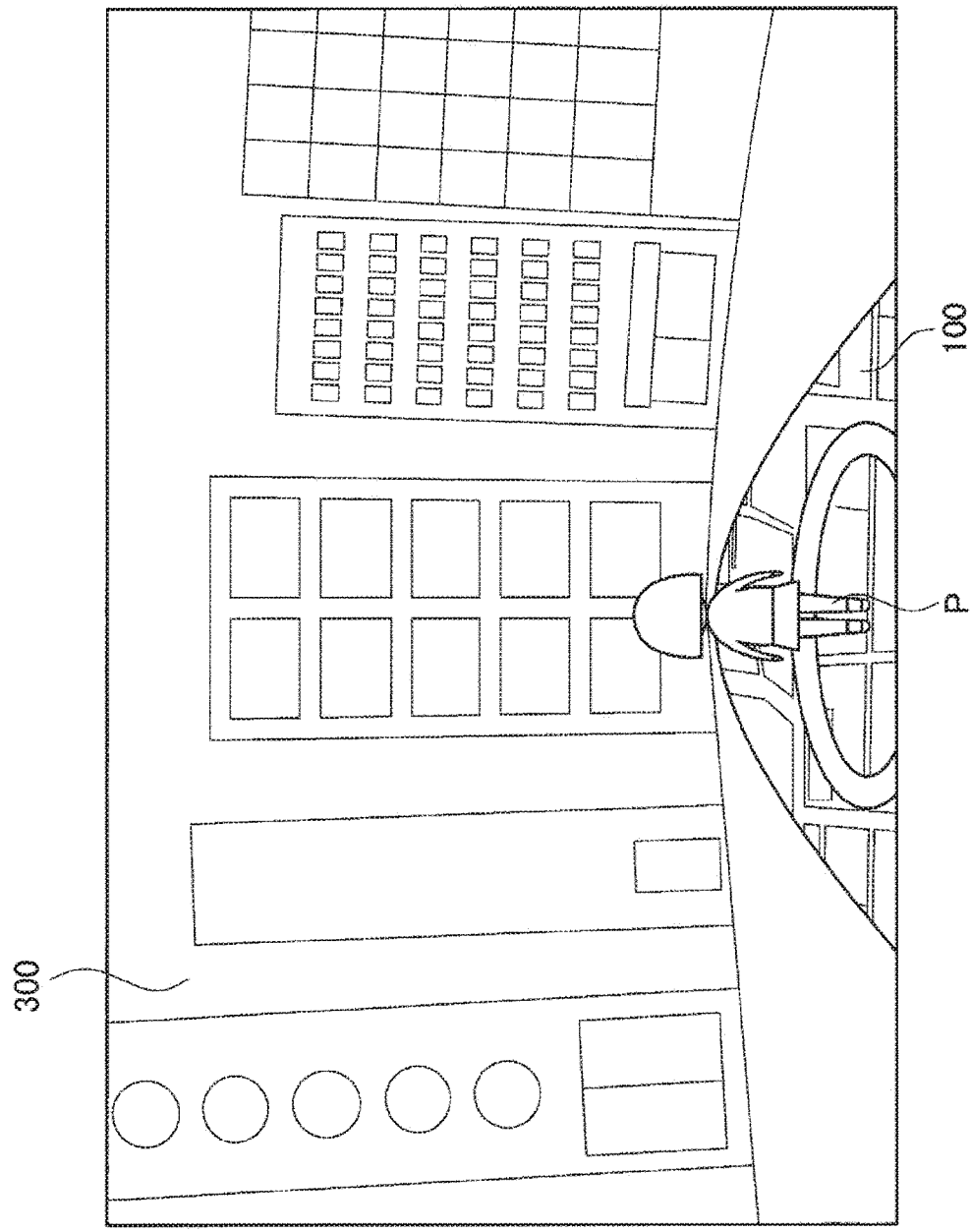
FIG. 9 is an explanatory diagram illustrating an example of a display on the display device.

In step S50, as illustrated in FIG. 9, the control unit 13 arranges the actual scene image 300 in the three-dimensional virtual space around the character image P. Then, the control unit 13 generates a display image seen from the virtual user's viewpoint. Note that the virtual user's viewpoint (i.e., where the viewpoint is in the actual scene image 300) at this time is preferably set in advance. Then, the control unit 13 causes the display device 20 to display the display image. Thus, the user can view the actual scene image 300. Thereafter, the control unit 13 erases the character image P and map image 100 and proceeds to the second display control process. Note that when the actual scene image 300 is to be displayed, the character image P and map image 100 may be erased immediately.

(1-2-2. Second Display Control Process)

Figure 10:
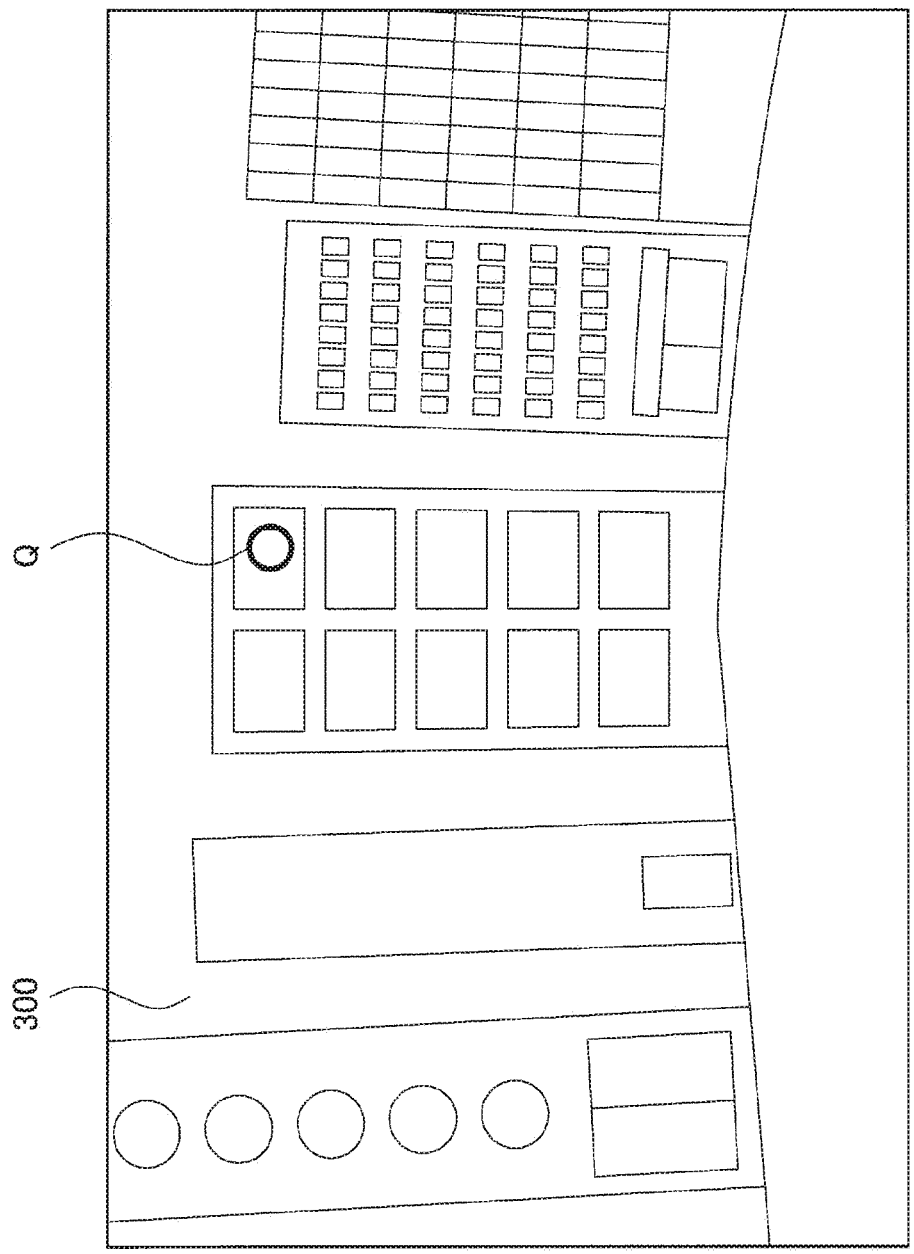
FIG. 10 is an explanatory diagram illustrating an example of a display on the display device.

Next, the second display control process will be described with reference to FIGS. 5 to 12. In step S60, as illustrated in FIG. 10, the control unit 13 arranges the actual scene image 300 (the actual scene image 300 corresponding to the gaze point image; so-called scene images) in the three-dimensional virtual space. Therefore, it can be said that the actual scene image 300 is a three-dimensional image. Furthermore, the control unit 13 receives the attitude detection information at any time and specifies the virtual user's viewpoint on the basis of the attitude detection information. Then, the control unit 13 arranges the virtual user's viewpoint image Q indicating the virtual user's viewpoint, in the three-dimensional virtual space.

Figure 12:
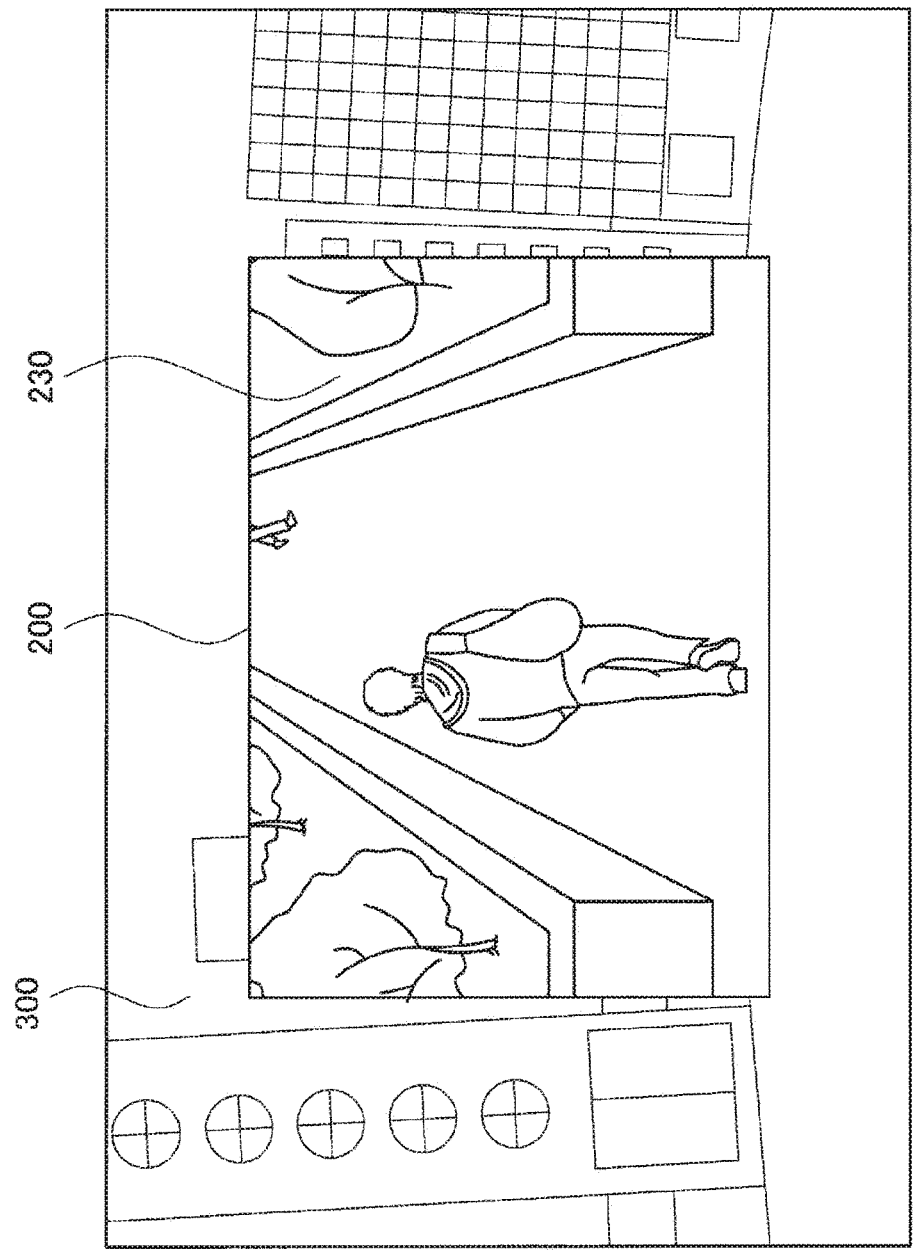
FIG. 12 is an explanatory diagram illustrating an example of a display on the display device.
Figure 13:
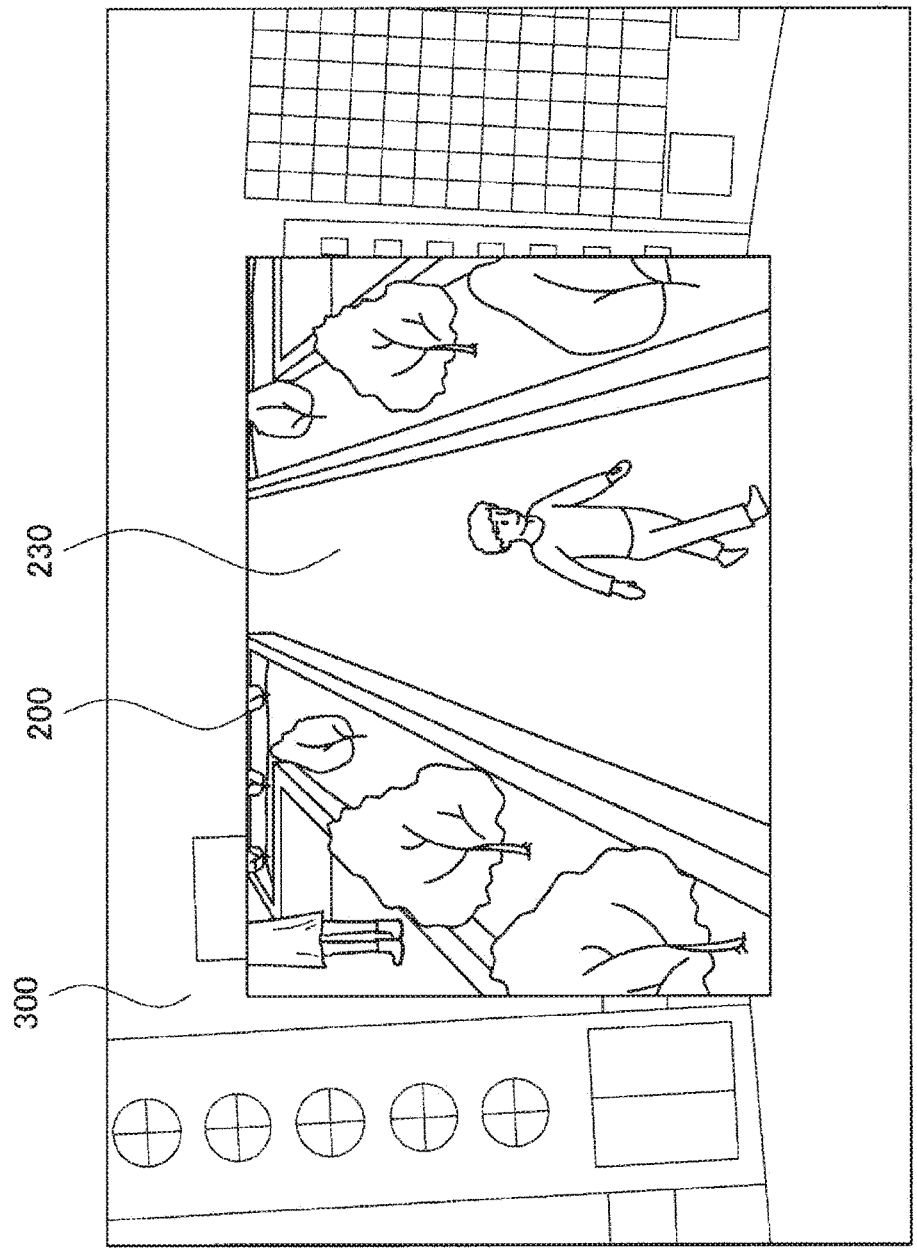
FIG. 13 is an explanatory diagram illustrating an example of a display on the display device.

Furthermore, the control unit 13 specifies a target point image 110 (hereinafter also referred to as an "immediate target point image") closest to the gaze point image. In the example of FIG. 7, the immediate target point image is the target point image 110b. Hereinafter, a target point indicated by the immediate target point image is also referred to as an "immediate target point". Next, the control unit 13 generates a moving viewpoint image 230 illustrated in FIGS. 12 and 13. Here, the moving viewpoint image 230 is an actual scene image seen from the virtual user's viewpoint being moving from the gaze point to the immediate target point. FIGS. 12 and 13 illustrate one scene (image displayed at a certain point of time during reproduction of the moving viewpoint image 230) of the moving viewpoint image 230.

For example, the control unit 13 may acquire a plurality of captured images captured at points in a route from the gaze point to the immediate target point and generate the moving viewpoint image 230 on the basis of the captured images. These captured images may be stored in the storage unit 12 or may be acquired from another information processing device by the communication unit 11. It can be said that the moving viewpoint image 230 indicates a route from the gaze point to the immediate target point.

The moving viewpoint image 230 may indicate a route to a target point other than the immediate target point. Furthermore, the control unit 13 may select a plurality of target points and generate a moving viewpoint image 230 corresponding to each of the target points. Furthermore, the moving viewpoint image 230 may be a planar image or may be a three-dimensional image as in the actual scene image 300. Furthermore, the moving viewpoint image 230 may be a time-lapse movie. In other words, the control unit 13 may continuously display still images. These still images may be planar images or three-dimensional images. In a case where the moving viewpoint image 230 is the planar image or the time-lapse movie, the data volume of the moving viewpoint image 230 can be reduced. From the viewpoint of the data volume, it is preferable that the moving viewpoint image 230 be the time-lapse movie and the still images constituting the time-lapse movie be planar images.

Figure 11:
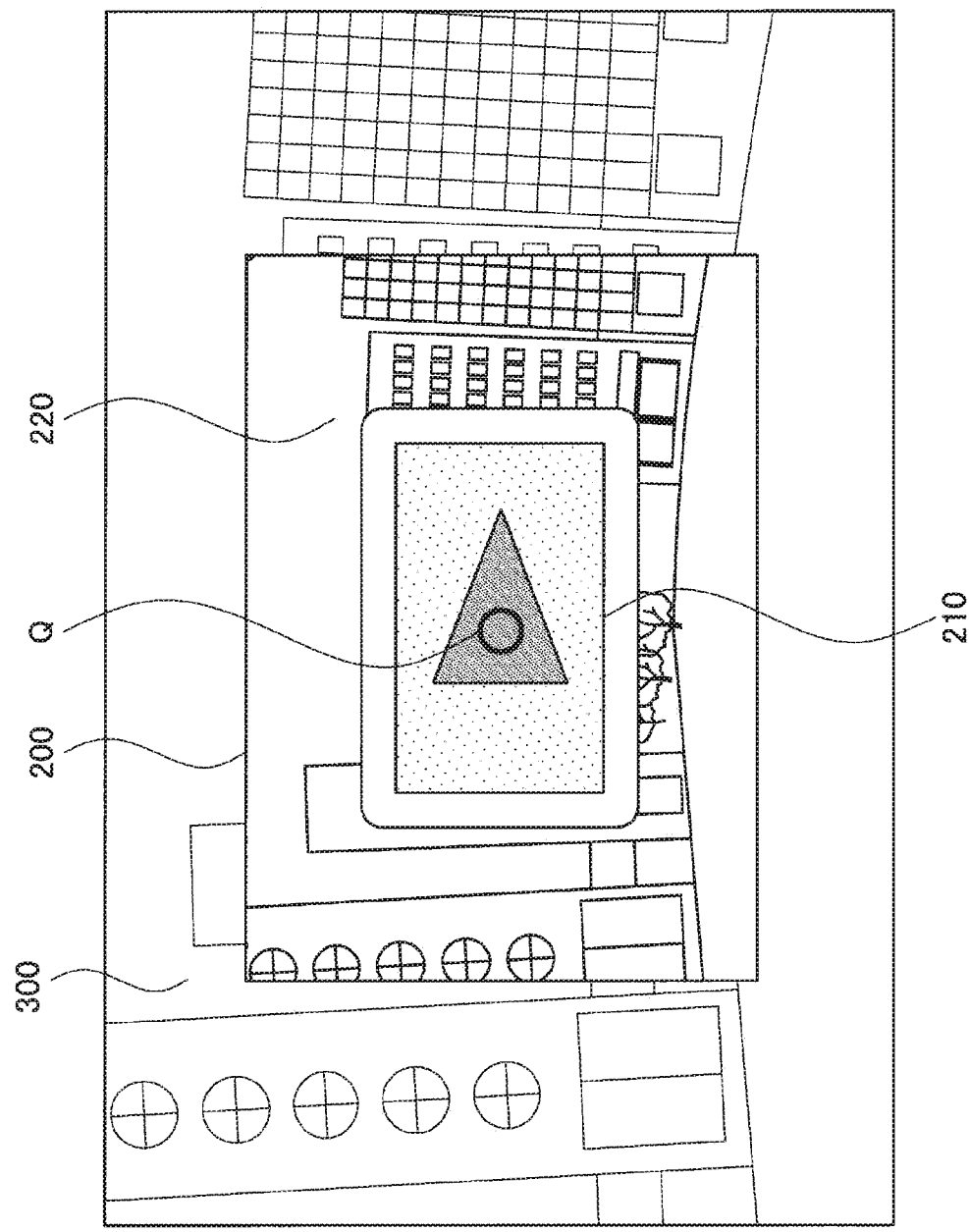
FIG. 11 is an explanatory diagram illustrating an example of a display on the display device.

Next, the control unit 13 arranges an image display frame 200 illustrated in FIG. 11 in the three-dimensional virtual space. Here, the moving viewpoint image 230 and the like are displayed in the image display frame 200. For example, the control unit 13 arranges the image display frame 200 at a position corresponding to an intersection of the route from the gaze point to the immediate target point with a region in the three-dimensional virtual space where the actual scene image 300 is arranged. Thus, the user can easily understand from which position in the actual scene image 300 the user can move to the immediate target point. In a case where a plurality of moving viewpoint images 230 is generated, the control unit 13 arranges an image display frame 200 corresponding to each of the moving viewpoint images 230 in the three-dimensional virtual space.

Here, the control unit 13 may adjust the size of the image display frame 200 according to the distance from the gaze point to the immediate target point. For example, the control unit 13 may reduce the size of the image display frame 200 as the distance from the gaze point to the immediate target point increases. Thus, the user can grasp the sense of distance to the immediate target point. Note that the control unit 13 may return the size of the image display frame 200 to a preset size during reproduction of the moving viewpoint image 230. This is because if the image display frame 200 is too small, it may become difficult for the user to view the moving viewpoint image 230.

Furthermore, the control unit 13 arranges a symbol image in the image display frame 200. Here, the symbol image is an image indicating that the moving viewpoint image 230 is displayed in the image display frame 200. FIG. 11 illustrates an example of the symbol image. In the example illustrated in FIG. 11, the control unit 13 arranges, as the symbol image, a play button image 210 and a thumbnail image 220 in the image display frame 200. The thumbnail image 220 may be the first scene (image to be displayed first) of the moving viewpoint image 230. Furthermore, the symbol image may be a landmark image indicating a landmark existing at the immediate target point. In this case, the user can readily understand what kind of landmark exists at the immediate target point. Furthermore, the symbol image may be omitted. In this case, displaying the actual scene image 300 also in the image display frame 200 results in continuous display of the actual scene image 300 inside and outside the image display frame 200. This configuration causes the user to view a natural image. However, in this case, it is difficult for the user to understand where the image display frame 200 is. Therefore, the control unit 13 may highlight (e.g., color, or the like) the image display frame 200.

Next, the control unit 13 generates a display image seen from the virtual user's viewpoint and causes the display device 20 to display the display image. Furthermore, the control unit 13 receives the attitude detection information at any time and generates a display image on the basis of the attitude detection information. Then, the control unit 13 causes the display device 20 to display the display image. In other words, the control unit 13 performs control to display, with the user's first-person viewpoint, the three-dimensional virtual space in which the actual scene image 300 and the like are arranged. Thus, the user can view the actual scene image 300 and the symbol image while freely moving the virtual user's viewpoint in the three-dimensional virtual space. Therefore, the user can enjoy a virtual experience as if the user is in a real scene.

In step S70, the control unit 13 determines whether or not the user is gazing at the symbol image. For example, the control unit 13 determines whether or not the virtual user's viewpoint image Q is on the symbol image for more than a predetermined time period. FIG. 11 illustrates a state in which the virtual user's viewpoint image Q is on the symbol image. In a case where the control unit 13 determines that the user is gazing at the symbol image, the process proceeds to step S80, and in a case where the control unit 13 determines that the user is not gazing at the symbol image, the process is finished.

In step S80, as illustrated in FIGS. 12 and 13, the control unit 13 displays (reproduces) the moving viewpoint image 230 in the image display frame 200. Here, the control unit 13 fixes the peripheral image (i.e., the actual scene image 300) of the image display frame 200 while the moving viewpoint image 230 is being displayed (reproduced). In other words, the control unit 13 performs control to display, with the user's first-person viewpoint, the three-dimensional virtual space where the viewed target image (here, the moving viewpoint image 230) is arranged. The viewed target image is a target to be viewed by the user. Furthermore, the control unit 13 performs control to change the viewed target image (here, reproduce the moving viewpoint image 230) while fixing the peripheral image (here, the actual scene image 300 positioned around the image display frame 200) of the viewed target image. Thus, the user can readily understand the atmosphere (characteristics in the route, direction of movement, distance of movement, time period of movement, and the like) of the route from the gaze point to the immediate target point.

Here, the control unit 13 may change a display mode of the moving viewpoint image 230 according to the skill level of the user (the number of times of reproducing the moving viewpoint image 230, or the like). For example, the control unit 13 may increase the display speed (reproduction speed) of the moving viewpoint image 230 as the user has a higher skill level. Furthermore, in a case where the moving viewpoint image 230 is displayed (reproduced) in the form of time-lapse, the number of still images used for the moving viewpoint image 230 may be reduced. Even if the control unit 13 displays the moving viewpoint image 230 in such a manner, the user having a higher skill level is expected to understand the contents of the moving viewpoint image 230.

Furthermore, the control unit 13 may omit the reproduction of the moving viewpoint image 230 in response to a selection operation or the like by a user. This is because a user who hardly feels uncomfortable (i.e., a user who hardly gets motion sickness) in change of the image may have a desire to immediately view a next scene image.

Furthermore, in a case where the moving viewpoint image 230 shows a person therein, a reproduction mode of the moving viewpoint image 230 may be changed depending on the number of persons. For example, the display speed (reproduction speed) of the moving viewpoint image 230 may be reduced as the number of person images in the moving viewpoint image 230 increases. This is because it is expected that the more time takes for the user to grasp the route, as the number of people in the moving viewpoint image 230 increases. Furthermore, the control unit 13 may prepare a plurality of kinds of moving viewpoint images 230 captured in different time slots to display a moving viewpoint image 230 selected by the user. Thus, the user can grasp the atmosphere of each time slot. Furthermore, the control unit 13 may display the moving viewpoint image 230 captured in a time slot in which there are a smaller number of people. In this case, the user can more readily understand the atmosphere of the route.

Furthermore, when the virtual user's viewpoint is out of the moving viewpoint image 230 during reproduction of the moving viewpoint image 230, the control unit 13 may cancel the reproduction of the moving viewpoint image 230 and return the state in the image display frame 200 to an initial state (i.e., a state in which the symbol image is displayed).

Thereafter, the control unit 13 repeats the second display control process with the immediate target point as the gaze point. In other words, an actual scene image (scene image) at the immediate target point is arranged in the three-dimensional virtual space. As described above, in the present embodiment, the moving viewpoint image 230 in the image display frame 200 is reproduced first, and then the whole of the display image including the peripheral image becomes a next scene image. In this regard, for example, in a case where the whole display image is set as the moving viewpoint image 230, the user may feel uncomfortable. However, in the present embodiment, the moving viewpoint image 230 is displayed only in the image display frame 200, that is, only in the region which the user is gazing at, and the peripheral image thereof is fixed. Therefore, the user hardly feels uncomfortable during reproduction of the moving viewpoint image 230.

Here, the control unit 13 may display the actual scene image of the immediate target point when the virtual user's viewpoint falls in the image display frame 200 again, instead of immediately after the reproduction of the moving viewpoint image 230.

Furthermore, in the embodiment described above, although the actual scene image is arranged in the three-dimensional virtual space, another type of image, for example, a scene image artificially created may be arranged. For example, the present embodiment may be applied to a game or the like in which three-dimensional display is performed. In this case, both of the map image and the moving viewpoint image are also generated on the basis of the scene image artificially generated. Even in the game in which a three-dimensional display is performed, the user may have uncomfortable feeling as described above. Therefore, performance of the process according to the present embodiment enables reduction of the user's uncomfortable feeling.

As described above, according to the present embodiment, the control unit 13 performs control to display, with the user's first-person viewpoint, a three-dimensional virtual space where a viewed target image (e.g., the character image P and the moving viewpoint image 230) is arranged. The viewed target image is a target to be viewed by the user. Then, the control unit 13 performs control to change the viewed target image while fixing the peripheral image (e.g., the map image 100 and the actual scene image 300) of the viewed target image. In other words, the control unit 13 changes the viewed target image on which the user's attention is expected to be concentrated and fixes the peripheral image. Thus, it is possible to reduce the user's uncomfortable feeling. Furthermore, since this process does not change the quality of the peripheral image, the user can enjoy the virtual experience.

Furthermore, the control unit 13 changes the viewed target image in a manner associated with a direction in which the virtual user's viewpoint moves. Specifically, the control unit 13 moves the character image P (following/moving image) following the virtual user's viewpoint. Furthermore, the control unit 13 displays an image seen from the virtual user's viewpoint being moving, as the moving viewpoint image 230. Even in such a case, since the peripheral image is fixed, the user's uncomfortable feeling can be reduced.

Furthermore, since the control unit 13 arranges the actual scene image 300 in the three-dimensional virtual space, the user can enjoy the virtual experience as if the user exists in a real scene. Here, the control unit 13 may arrange, for example, a scene image artificially created in the three-dimensional virtual space. In this case, the user can enjoy the virtual experience as if the user him/herself in the created scene.

Furthermore, the control unit 13 sets a plurality of target points in the three-dimensional virtual space. For example, the control unit 13 sets a plurality of target points on the map image arranged in the three-dimensional virtual space. Then, the control unit 13 arranges a scene image corresponding to any one of the target points (e.g., the user's gaze viewpoint) in the three-dimensional virtual space. Then, the control unit 13 performs control to display, as the moving viewpoint image 230, a scene image seen from the virtual user's viewpoint being moving from one target point to another target point (e.g., the immediate target point). Thus, the user can readily understand the atmosphere of a route from the one target point to the other target point. Furthermore, in a case where the other target point is the immediate target point, the user can readily understand the atmosphere of a route to the immediate target point.

Furthermore, the control unit 13 arranges the symbol image in the image display frame 200, performing control to display the moving viewpoint image 230 when the virtual user's viewpoint overlaps the symbol image. Therefore, the user can readily understand that the moving viewpoint image 230 is displayed at which position in the three-dimensional virtual space.

Furthermore, since the control unit 13 arranges, as the symbol image, the landmark image indicating a landmark existing at another target point, the user can readily understand what kind of landmark exists at the other target point.

Furthermore, the control unit 13 arranges the image display frame 200 at a position corresponding to an intersection of a route from one target point to another target point with a region where the actual scene image 300 is arranged. Therefore, the user can readily understand from which position in the actual scene image 300 the user can move to the other target point.

Furthermore, the control unit 13 displays the moving viewpoint image 230 as a planar image. Thus, the data volume of the moving viewpoint image 230 can be reduced.

Furthermore, the control unit 13 displays the moving viewpoint image 230 in the form of time-lapse. Thus, the data volume of the moving viewpoint image 230 can be reduced.

Furthermore, in a case where the virtual user's viewpoint overlaps the target point image 110, the control unit 13 overlaps the character image P on the target point image 110. Next, the control unit 13 performs control to display the actual scene image 300 of the target point (i.e., the gaze point) in the three-dimensional virtual space around the character image P. Therefore, the control unit 13 moves the character image P before displaying the actual scene image 300, and thus, the user can expect future image change. Therefore, even if the actual scene image 300 is displayed in the three-dimensional virtual space around the character image P, the user unlikely has an uncomfortable feeling.

Furthermore, the control unit 13 performs control to notify the user that the actual scene image 300 of the target point (i.e., the gaze point) is to be displayed, before the actual scene image 300 is displayed in the three-dimensional virtual space around the character image P. For example, the control unit 13 performs control to output a notification sound. This makes it possible to cause the user to expect future image change.

As described above, preferable embodiments of the present disclosure has been described in detail with reference to the accompanying drawings, but the technical scope of the present technology is not limited to these examples. Those skilled in the art may obviously find various alternations and modifications within the technical ideas as set forth in the scope of the appended claims, and it should be understood that they will naturally come under the technical scope of the present invention.

Furthermore, the effects described herein are merely illustrative and demonstrative and are not limitative. In other words, the technology according to the present disclosure can exhibit, along with or instead of the effects, other effects apparent to those skilled in the art from the description herein.

Note that the present technology may also be configured as follows.

(1)

An information processing device including a control unit that performs control to display, with a user's first-person viewpoint, a three-dimensional virtual space where a viewed target image is arranged and performing control to change the viewed target image while fixing a peripheral image of the viewed target image, the viewed target image being a target to be viewed by a user.

(2)
The information processing device according to (1), in which the control unit changes the viewed target image in a manner associated with a direction in which a virtual user's viewpoint set in the three-dimensional virtual space moves.

(3)
The information processing device according to (2), in which the control unit arranges a scene image in the three-dimensional virtual space.

(4)
The information processing device according to (3), in which the scene image includes an actual scene image obtained by imaging an actual scene.

(5)
The information processing device according to (3) or (4), in which the control unit arranges an image display frame in the three-dimensional virtual space and performs control to display, in the image display frame, as the viewed target image, a moving viewpoint image seen from the virtual user's viewpoint being moving.

(6)
The information processing device according to (5), in which the control unit sets a plurality of target points in the three-dimensional virtual space, arranges the scene image corresponding to any one of the target points in the three-dimensional virtual space, and performs control to display, as the moving viewpoint image, the scene image seen from the virtual user's viewpoint being moving from the one target point to another target point.

(7)
The information processing device according to (6), in which the control unit sets the other target point as a target point closest to the one target point.

(8)
The information processing device according to (6) or (7), in which the control unit arranges a symbol image in the image display frame and performs control to display the moving viewpoint image when the virtual user's viewpoint overlaps the symbol image.

(9)
The information processing device according to (8), in which the control unit arranges, as the symbol image, a landmark image indicating a landmark existing at the other target point.

(10)
The information processing device according to any of (6) to (9), in which the control unit arranges the image display frame at a position corresponding to an intersection of a route from the one target point to the other target point with a region where the scene image is arranged.

(11)
The information processing device according to any of (5) to (10), in which the control unit displays the moving viewpoint image as a planar image.

(12)
The information processing device according to any of (5) to (11), in which the control unit displays the moving viewpoint image in a form of time-lapse.

(13)
The information processing device according to any of (2) to (12), in which the control unit arranges a map image in the three-dimensional virtual space.

(14)
The information processing device according to (13), in which the control unit performs control to display, as the viewed target image, a following/moving image moving on the map image while following the virtual user's viewpoint.

(15)
The information processing device according to (14), in which the control unit arranges a target point image indicating a target point, on the map image.

(16)
The information processing device according to (15), in which in a case where the virtual user's viewpoint overlaps the target point image, the control unit overlaps the following/moving image on the target point image, and then, performs control to display a scene image of the target point in the three-dimensional virtual space around the following/moving image.

(17)
The information processing device according to (16), in which the control unit performs control to notify the user that the scene image of the target point is to be displayed, before the scene image is displayed in the three-dimensional virtual space around the following/moving image.

(18)
An information processing method wherein, a processor performs control to display a three-dimensional virtual space where a viewed target image which is to be viewed by a user is arranged, with a user's first-person viewpoint, and performs control to change the viewed target image while fixing a peripheral image of the viewed target image.

(19)
A program for causing
a computer to achieve a control function of
performing control to display, with a user's first-person viewpoint, a three-dimensional virtual space where a viewed target image is arranged and performing control to change the viewed target image while fixing a peripheral image of the viewed target image, the viewed target image being a target to be viewed by a user.

REFERENCE SIGNS LIST

1 Information processing system
10 Control device
11 Communication unit
12 Storage unit
13 Control unit
20 Display device
21 Communication unit
22 Attitude detection unit
23 Display unit
24 Display control unit
30 Communication cable
100 Map image
110 Target point image
P Character image
Q Virtual user's viewpoint image
200 Image display frame
210 Play button image
220 Thumbnail image
230 Moving viewpoint image
300 Actual scene image

The invention claimed is:
1. An information processing device, comprising:
a central processing unit (CPU) configured to:
control, based on a first viewpoint of a user, a display screen to display a three-dimensional virtual space, wherein
the three-dimensional virtual space includes a viewed target image,
the viewed target image corresponds to a target viewable by the user, and the first viewpoint of the user corresponds to a viewpoint in a real space; and based on a movement of a second viewpoint of the user, the display screen to display a movement of the viewed target image from a first target point of a plurality of target points in the three-dimensional virtual space to a second target point of the plurality of target points while peripheral image of the viewed target image is fixed, wherein the second viewpoint of the user corresponds to a viewpoint in the three-dimensional virtual space.

2. The information processing device according to claim 1, wherein the CPU is further configured to control, based on a direction of the movement of the second viewpoint of the user in the three-dimensional virtual space, the display screen to display the movement of the viewed target image.

3. The information processing device according to claim 2, wherein the CPU is further configured to control the display screen to display a scene image in the three-dimensional virtual space.

4. The information processing device according to claim 3, wherein the scene image corresponds to an image of an actual scene.

5. The information processing device according to claim 3, wherein the CPU is further configured to:
control the display screen to display an image display frame in the three-dimensional virtual space; and
control the display screen to display, in the image display frame, as the viewed target image, a movement of a moving viewpoint image from the second viewpoint of the user.

6. The information processing device according to claim 5, wherein the CPU is further configured to:
set the plurality of target points in the three-dimensional virtual space;
control the display screen to display the scene image corresponding to one of the plurality of target points in the three-dimensional virtual space; and
control the display screen to display, as the moving viewpoint image, a movement of the scene image from the second viewpoint from the first target point to the second target point.

7. The information processing device according to claim 6, wherein the CPU is further configured to set the second target point closest to the first target point among the plurality of target points.

8. The information processing device according to claim 6, wherein the CPU is further configured to:
control the display screen to display a symbol image in the image display frame; and
control, based on the second viewpoint that overlaps the symbol image, the display screen to display the moving viewpoint image.

9. The information processing device according to claim 8, wherein the CPU is further configured to control the display screen to display, as the symbol image, a landmark image that indicates a landmark at the second target point.

10. The information processing device according to claim 6, wherein
the CPU is further configured to control the display screen to display the image display frame at a position corresponding to an intersection of a route from the first target point to the second target point with a region in the three-dimensional virtual space,
the region includes the scene image.

11. The information processing device according to claim 5, wherein the CPU is further configured to control the display screen to display the moving viewpoint image as a planar image.

12. The information processing device according to claim 5, wherein the CPU is further configured to control the display screen to display the moving viewpoint image in a form of time-lapse.

13. The information processing device according to claim 2, wherein the CPU is further configured to control the display screen to display a map image in the three-dimensional virtual space.

14. The information processing device according to claim 13, wherein the CPU is further configured to control the display screen to display, as the viewed target image, a movement of a moving image on the map image.

15. The information processing device according to claim 14, wherein CPU is further configured to control the display screen to display a target point image that indicates a target point on the map image.

16. The information processing device according to claim 15, wherein the CPU is further configured to:
control, based on the second viewpoint that overlaps the target point image, the display screen to display the moving image on the target point image; and
control the display screen to display a scene image of the target point in the three-dimensional virtual space around the moving image.

17. The information processing device according to claim 16, wherein the CPU is further configured to control the display screen to notify the user that the scene image of the target point is to be displayed, before the scene image is displayed in the three-dimensional virtual space around the moving image.

18. An information processing method, comprising:
controlling, based on a first viewpoint of a user, a display screen to display a three-dimensional virtual space, wherein
the three-dimensional virtual space includes a viewed target image,
the viewed target image corresponds to a target viewable by the user, and
the first viewpoint of the user corresponds to a viewpoint in a real space; and
controlling, based on a movement of a second viewpoint of the user, the display screen to display a movement of the viewed target image from a first target point of a plurality of target points in the three-dimensional virtual space to a second target point of the plurality of target points while a peripheral image of the viewed target image is fixed, wherein the second viewpoint of the user corresponds to a viewpoint in the three-dimensional virtual space.

19. A non-transitory computer-readable medium having stored thereon computer-executable instructions which, when executed by a central processing unit (CPU) of an information processing device, cause the CPU to execute operations, the operations comprising:
controlling, based on a first viewpoint of a user, a display screen to display a three-dimensional virtual space, wherein
the three-dimensional virtual space includes a viewed target image,
the viewed target image corresponds to a target viewable by the user, and
the first viewpoint of the user corresponds to a viewpoint in a real space; and controlling, based on a movement of a second viewpoint of the user, the display screen to display a movement of the viewed target image from a first target point of a plurality of target points in the three-dimensional virtual space to a second target point of the plurality of target points while a peripheral image of the viewed target image is fixed, wherein the second viewpoint of the user corresponds to a viewpoint in the three-dimensional virtual space.

* * * * *